United States Patent [19]

Lehnert

[11] 4,274,110
[45] Jun. 16, 1981

[54] PROJECTION TELEVISION SYSTEM

[75] Inventor: Stanley E. Lehnert, Addison, Ill.

[73] Assignee: Zenith Radio Corporation, Glenview, Ill.

[21] Appl. No.: 110,413

[22] Filed: Jan. 8, 1980

[51] Int. Cl.³ .......................... H04N 9/31; H04N 9/18; H04N 5/74
[52] U.S. Cl. .......................................... 358/60; 358/237
[58] Field of Search ...................... 358/60, 62, 64, 237, 358/238, 239, 233, 231; 313/477 R, 478, 474

[56] References Cited

U.S. PATENT DOCUMENTS

| 2,777,084 | 1/1957 | Lafferty | 313/458 |
| 4,004,093 | 1/1977 | Oland | 358/60 |
| 4,024,579 | 5/1977 | Hergenrother et al. | 358/231 |
| 4,032,968 | 6/1977 | Miyoshi | 358/60 |
| 4,194,216 | 3/1980 | Ohmori | 358/60 |

FOREIGN PATENT DOCUMENTS 2837249 3/1979 Fed. Rep. of Germany .

Primary Examiner—John C. Martin
Attorney, Agent, or Firm—Ralph E. Clarke, Jr.

[57] ABSTRACT

Means and method are disclosed for compensating for non-linear magnification distortion in projection television systems. The projection television system has a projection screen for displaying a light image cast thereon. The screen is spaced apart from at least one light projection means whose projection optical axis lies at a non-zero, acute-angle A with respect to the screen axis. The light projection means comprises cathode ray tube means having a cathodoluminescent screen on the inside surface of a face panel thereof whose axis is substantially parallel to the projection optical axis. Electron-beam generating means are disposed on the cathode ray tube electron-optical axis for forming an electron image on the cathodoluminescent screen which is converted to a visible image by the cathodoluminescent screen. Lens means on the projection optical axis provide for projecting on the projection screen the light image of the electron-formed visible image. The light image inherently has non-linear magnification distortion attributable to the location of the projection means off the projection screen axis.

The system is characterized according to one embodiment of the invention by the cathode ray tube electron-optical axis defining a non-zero, acute-angle B with respect to the axis of the cathodoluminescent screen. The value of the angle B and the orientation of the electron optical axis is selected according to the invention to cause the electron-formed visible image to have an orientation and a non-linear magnification distortion effective to substantially compensate for the off-axis-induced non-linear magnification distortion of the projected light image.

17 Claims, 13 Drawing Figures

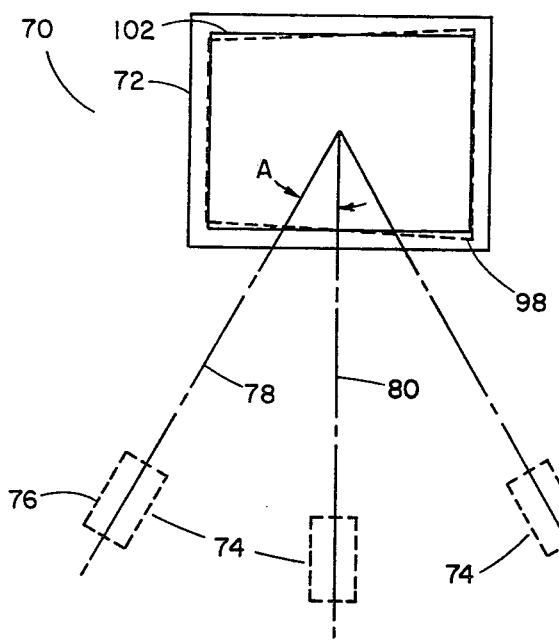
Fig. 4
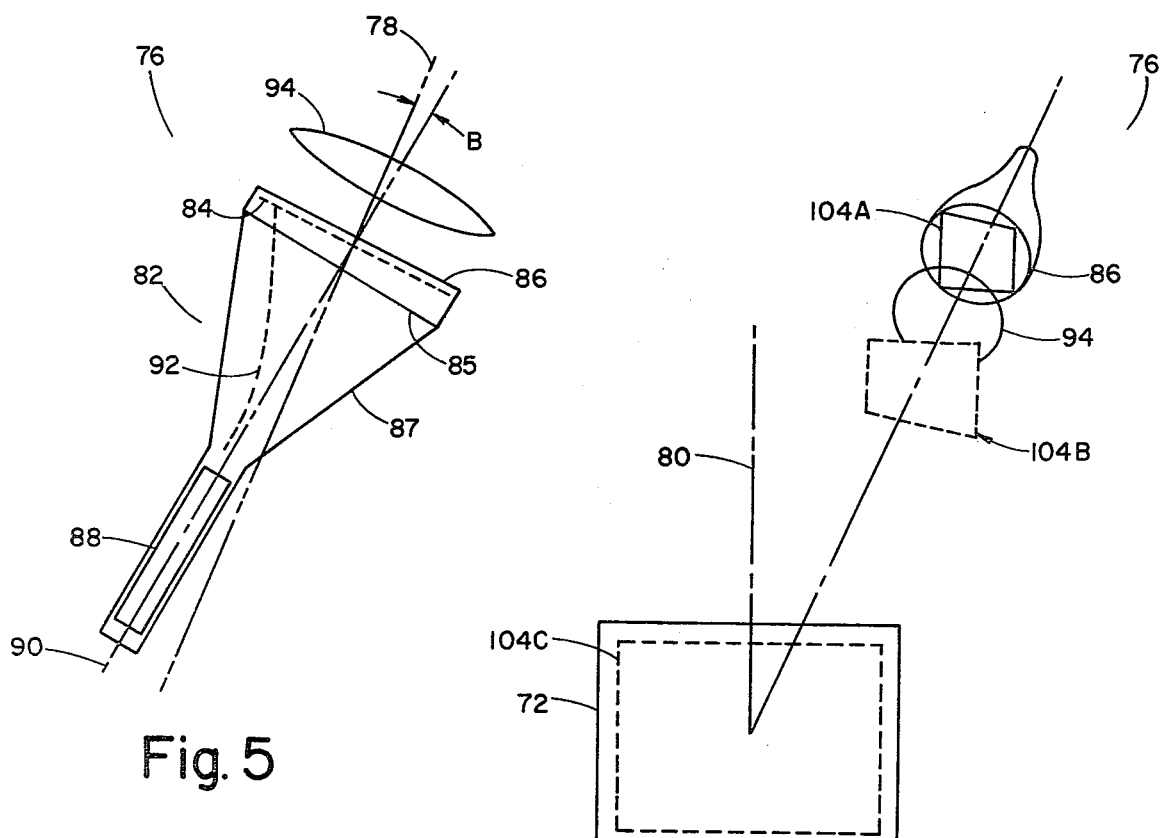
Fig. 5
Fig. 6

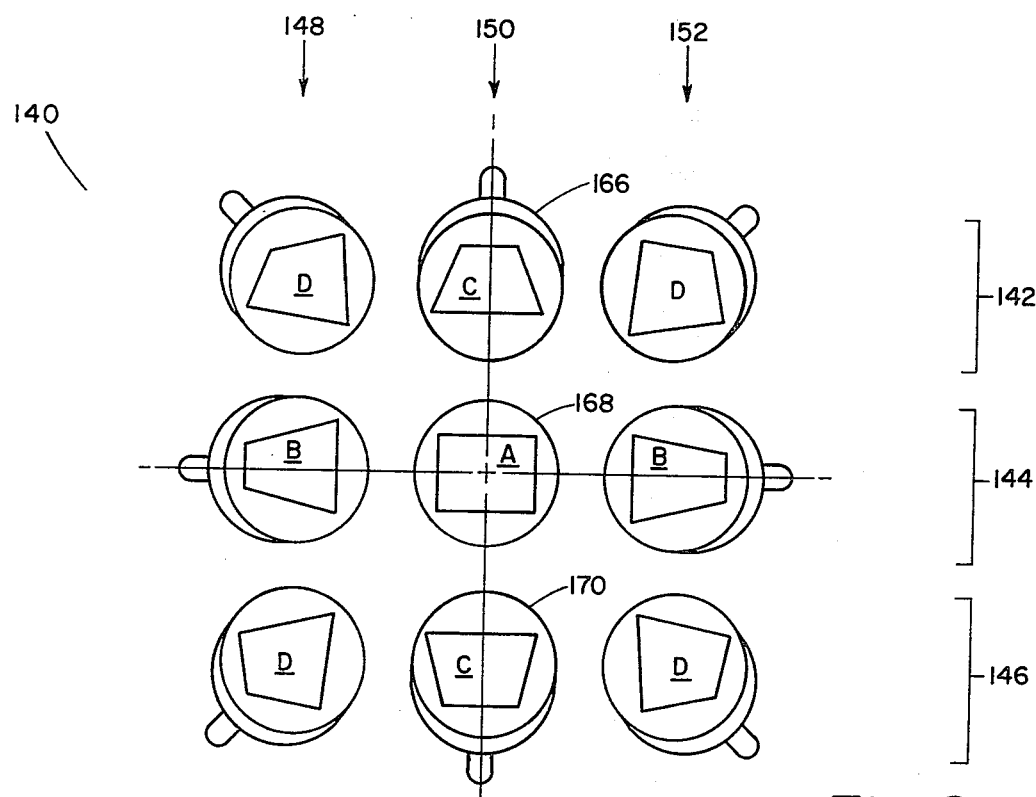
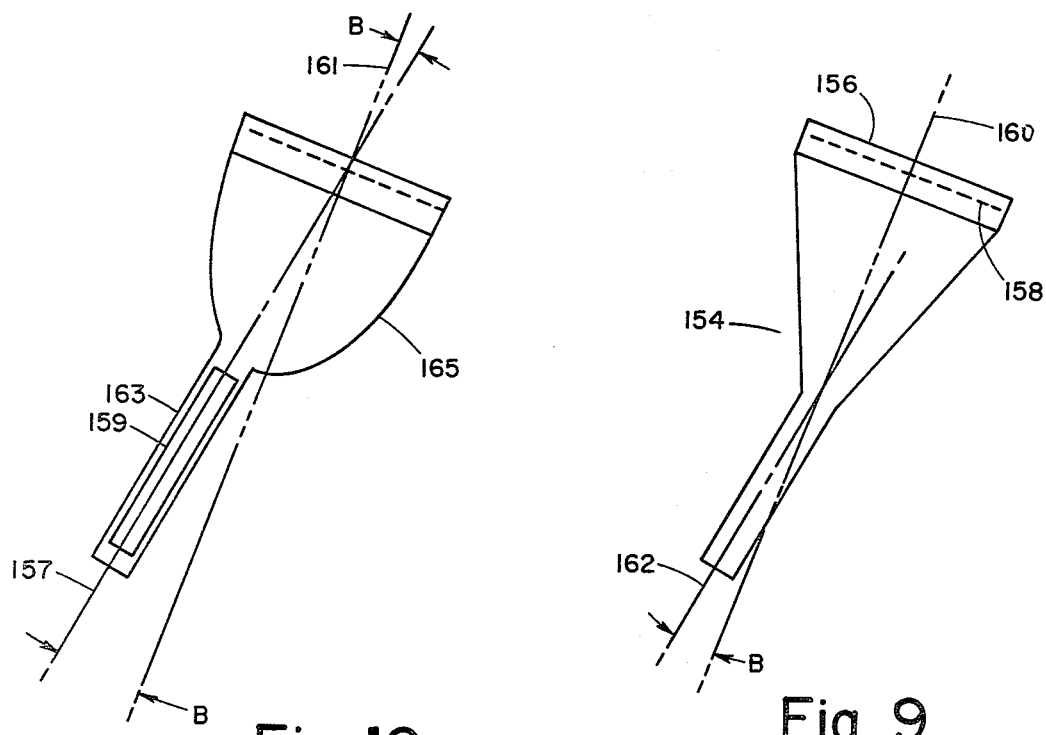
Fig. 8
Fig. 10
Fig. 9

PROJECTION TELEVISION SYSTEM

CROSS-REFERENCE TO RELATED PATENT APPLICATION

This application is related to but in no way dependent upon copending application of common ownership herewith, Ser. No. 154,197 filed May 29, 1980.

BACKGROUND OF THE INVENTION AND PRIOR ART DISCLOSURES

This invention is concerned with television systems, and is particularly directed to projection television systems in which discrete images are projected on a projection screen to provide a composite color picture.

FIG. 1 is a schematic plan view of the essentials of a representative prior art projection television system 6 in which a bank 8 of light projection devices 10, 12 and 14 project through the indicated associated lens means blue, green and red images, respectively, on projection screen 16. The projected images are intended to form the composite color image. Projection screen 16, which may be either of the front-projection or rear-projection type, typically has an aspect ratio of 3:4 in consonance with the aspect ratio of the standard television picture.

The centrally located device 12 typically has its projection optical axis 18 in congruence with screen axis 20, and as a result projects an undistorted light image on projection screen 16. The light images projected by devices 10 and 14, however, whose projection optical axis 22 and 24 respectively are located "off-axis" with respect to projection screen axis 20, inherently project light images which are distorted because of their off-axis location.

Two types of optical distortion are inherent in the system which can degrade through misconvergence the composite projected image to the point of unacceptability. The types are trapezoidal distortion and horizontal non-linearity, and they can best be described by the single term "non-linear magnification". As noted, the light image projected by the centrally located device 12 is not subject to non-linear magnification distortion because its projection optical axis 18 is congruent with the projection screen axis 20. As a result, the light image projected on light image screen 16 will be symmetrical and undistorted. The light image projected by device 12 is typically that shown in FIG. 2 by light image 26, indicated as being rectilinear.

This is not so with the light images as projected by devices 10 and 14. The inherent distortion of the light images due to the off-axis location is depicted by FIG. 2, wherein the light image projected by device 10 is indicated by configuration 28 as being trapezoidal. Similarly, the image projected by device 14 is indicated by configuration 30 as being trapezoidal. In a typical prior art projection television system, the non-linear magnification distortion may be of the order of five percent, an amount sufficient to so misregister the images as to render the composite picture unacceptable to the viewer.

It is to be noted that if the projection devices 10, 12 and 14 are vertically stacked, a similar distortion will be realized in the case of devices 10 and 14. The non-linear magnification distortion realized is described, in the context of this disclosure, as "keystoning" distortion, rather than "trapezoidal" distortion.

The second form of distortion—horizontal non-linearity—is also in consequence of the location of devices 10 and 14 off the projection screen axis 20. The effect of this type of distortion is depicted in FIG. 3, using as an example the light image 28 projected by light projection device 10, indicated as being trapezoidal due to the aforedescribed non-linear magnification distortion (the trapezoidal shape is exaggerated for the purpose of illustration). The lines 32A–G represent the vertical lines of a television screen cross-hatch generator, as projected. The effect of horizontal non-linearity distortion is apparent in the progressive increase from left to right in the distance between lines 32A–G. The vertical lines of the light image 30 projected by device 14 would be similarly distorted, but in the opposite direction.

One approach to the correction of trapezoidal distortion is by electronic means. For example, the image projected by the off-axis cathode ray tubes of projection means 10 and 14 can be made compensatorily trapezoidal. This can be done by synthesizing a correction wave form for application to a high-speed writing-type yoke which is placed in tandem with the main deflection yoke. The end result is a trapezoidally shaped raster inverse in orientation to the normal distortion of the image projected by the off-axis cathode ray tubes of projection means 10 and 14. Correction by such electronic means is plagued by the complications introduced in the television circuit, with a consequent increase in cost. The complexity and added cost is even greater in consequence of the fact that the correction circuitry for the two off-axis CRT's must be designed to exert an opposite effect on their projected images. The economic burden imposed by the electronic approach is further underscored in view of the fact that while it may be effective against trapezoidal distortion, it is largely ineffective in terms of correction for horizontal non-linearity distortion, wherein additional and very complex electronic correction circuitry must be employed.

Optical systems for reducing or otherwise ameliorating distortion include Oland—U.S. Pat. No. 4,004,093, which discloses a truncated Schmidt optical system wherein a plurality of Schmidt systems is clustered closely together by truncating the mutually adjacent edges of mirrors and correcting lenses which comprise individual Schmidt systems. Such clustering is said to provide a reduction in trapezoidal distortion by virtue of the fact that the cathode ray tubes for each primary color project images which arrive *almost* orthogonally at the screen.

Hergenrother et al—U.S. Pat. No. 4,024,579—discloses a projection television system in which the composite image is projected onto a curved screen by three discrete cathode ray tubes arranged as a triad, with each projecting a different primary color. The tube optics are folded into a catadioptric configuration and the three images are caused to converge into a composite image by an elaborate optical system that includes a Schmidt correction lens mounted externally to the envelope of each tube. Although the system has achieved a measure of consumer acceptance, the need for an extensive alignment procedure to achieve a satisfactory composite image, and the general lack of brilliance of the projected image, has limited its acceptance.

It is known in the art that if the axis of an electron gun is at an angle with respect to the axis of a cathode ray tube, the visible image on the face panel will exhibit non-linear magnification distortion. This type of distortion was common to certain early image iconoscope tubes of Vladimir Zworykin and was considered a performance liability. An example of a cathode ray tube configuration having an electron gun at an angle with respect to the tube axis is shown in U.S. Pat. No. 2,777,084 to Lafferty. Pat. No. 28 37 249 (German) discloses a system for optically correcting trapezoidal distortion of the image projected by cathode ray tubes located off a central axis. The projection system includes cathode ray tube color picture sources, each of which projects its image through a projection lens. Trapezoidal distortion is stated as being corrected by tilting the picture sources away from the central axis relative to the light axis of the associated projection lens. As a result, the image on the faceplate of the cathode ray tube is no longer parallel with the screen. When the image on the cathode ray tube faceplate is projected, the image on the screen is reputed to be parallel.

Examples of circuit means intended to provide convergence of multiple color image projectors are to be found in the following U.S. Pat. Nos.: Seright 2,654,854, Mengle 2,989,584, Austefjord 3,943,279.

OBJECTS OF THE INVENTION

It is a general object of the invention to provide for improved performance in certain projection television systems.

It is another object of the invention to provide for improved performance in projection television systems having off-the-axis image projection devices.

It is yet another object of the invention to provide for a reduction in the cost of projection television systems in terms of enhanced simplicity in design, easier set-up, and minimized need for electronic distortion-correction circuitry.

It is a more specific object of the invention to provide for the elimination of trapezoidal distortion in off-optical axis image projectors in projection television systems.

It is a specific object of the invention to provide for the simultaneous correction of trapezoidal distortion and horizontal non-linearity distortion in projection television systems by purely mechanical means.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 4 is a highly simplified schematic view of a projection television system having off-axis light projection means;

FIG. 5 shows diagramatically and in greater detail, one such off-axis projection means according to an embodiment of the invention;

FIG. 6 is a schematic view in perspective showing the beneficial effect of the FIG. 5 embodiment of the invention;

FIG. 8 is a view in elevation of an array of nine imageprojection devices according to the invention;

FIGS. 9 and 10 are schematic views of further embodiments according to the invention;

DESCRIPTION OF THE PREFERRED EMBODIMENT

Figure 1:
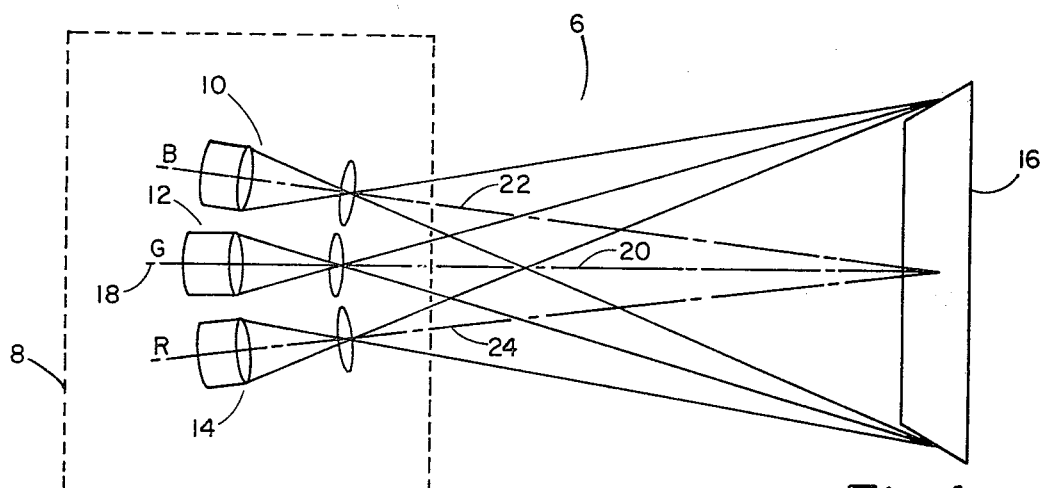
FIGS. 1-3 show diagramatically the cause and effects of two types of distortion experienced in certain prior art projection television systems.
Figure 2:
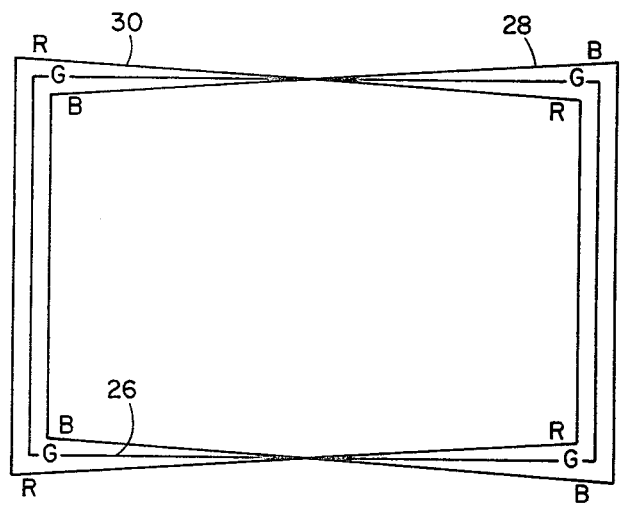
Figure 3:
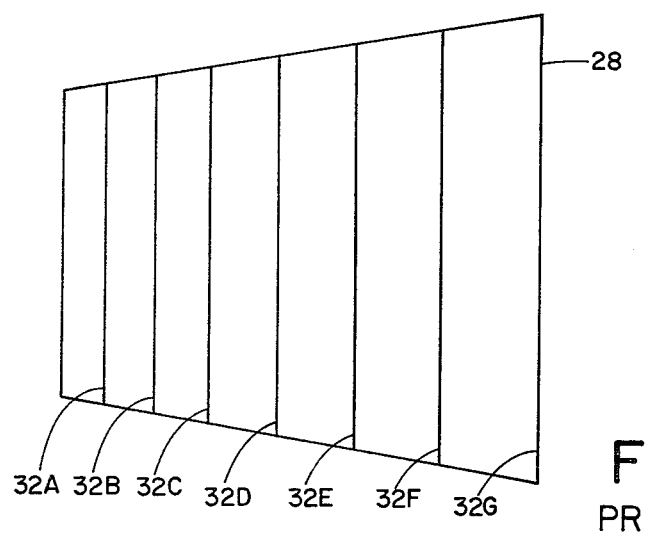

In FIG. 4 there is depicted schematically a projection television system 70. The system 70 has a projection screen 72 for displaying a light image cast thereon. Screen 72 is spaced apart from a plurality of light projection means 74. At least one light projection means, designated as being projection means 76, has a projection optical axis 78 at a non-zero, acute-angle A with respect to the projection screen axis 80.

With reference also to FIG. 5 wherein projection means 76 is depicted in greater detail, projection means 76 is indicated as including a cathode ray tube means 82 having a cathodoluminescent screen 84 on the inside surface of the face panel 86 whose axis is substantially parallel to the projection optical axis 78. The seal land 85 indicates the junction of the facepanel 86 and the funnel 87 of cathode ray tube 82; the significance of the seal band and its orientation will be described infra. The screen is made cathodoluminescent by a deposit of a monochrome phosphor which may comprise, for example, one of a number of phosphors emitting red, green or blue light upon excitation by an electron beam. The electron beam generating means 88, which is typically an electron gun, is disposed on the electron-optical axis 90 of cathode ray tube 82. Electron beam generating means 88 is indicated as emitting a scanning electron beam 92 which forms an electron image on the cathodoluminescent screen 84 in response to television signal information. The electron image is converted to a visible image by cathodoluminescent screen 84 as screen 84 is excited by beam 92.

Lens means 94 on projection optical axis 78 provides for projecting on projection screen 72 the light image of the electron-formed formed visible image on cathodoluminescent screen 84. The light image inherently has a non-linear magnification distortion attributable to the location of projection means 76 off the projection screen axis 80.

The non-linear magnification distortion of the light image as projected on projection screen 72 is shown in FIG. 4 as being trapezoidal, as indicated by the dash-line image 98. Horizontal non-linearity distortion is also present as described heretofore.

The projection television system according to the invention is characterized by the electron-optical axis 90 of cathode ray tube means 82 defining a non-zero, acute-angle B with respect to the axis of cathodoluminescent screen 84. The value of angle B and the orientation of the electron-optical axis is selected to cause the electron-formed visible image to have an orientation and non-linear magnification distortion effective to substantially compensate for the off-axis-induced non-linear distortion of the projected light image.

The remedial effect is depicted in FIG. 6, which is view looking over the screen 72 and toward the face panel 86 of light projection means 76. An electron-formed visible image 104A, depicted as being trapezoidal has, according to the invention, an orientation and non-linear magnification distortion effective to substantially compensate for the off-axis-induced non-linear magnification distortion of the projected light image. Image 104A is shown as being reversed in orientation by transmission through lens means 94; the shape of the image in space as projected on projection screen 72 is indicated by light image 104B. It will be seen that image 104A substantially compensates, according to the invention, for the off-axis-induced non-linear magnification distortion, as indicated by image 104C cast on projection screen 105, depicted as being substantially free of non-linear magnification distortion.

Figure 7:
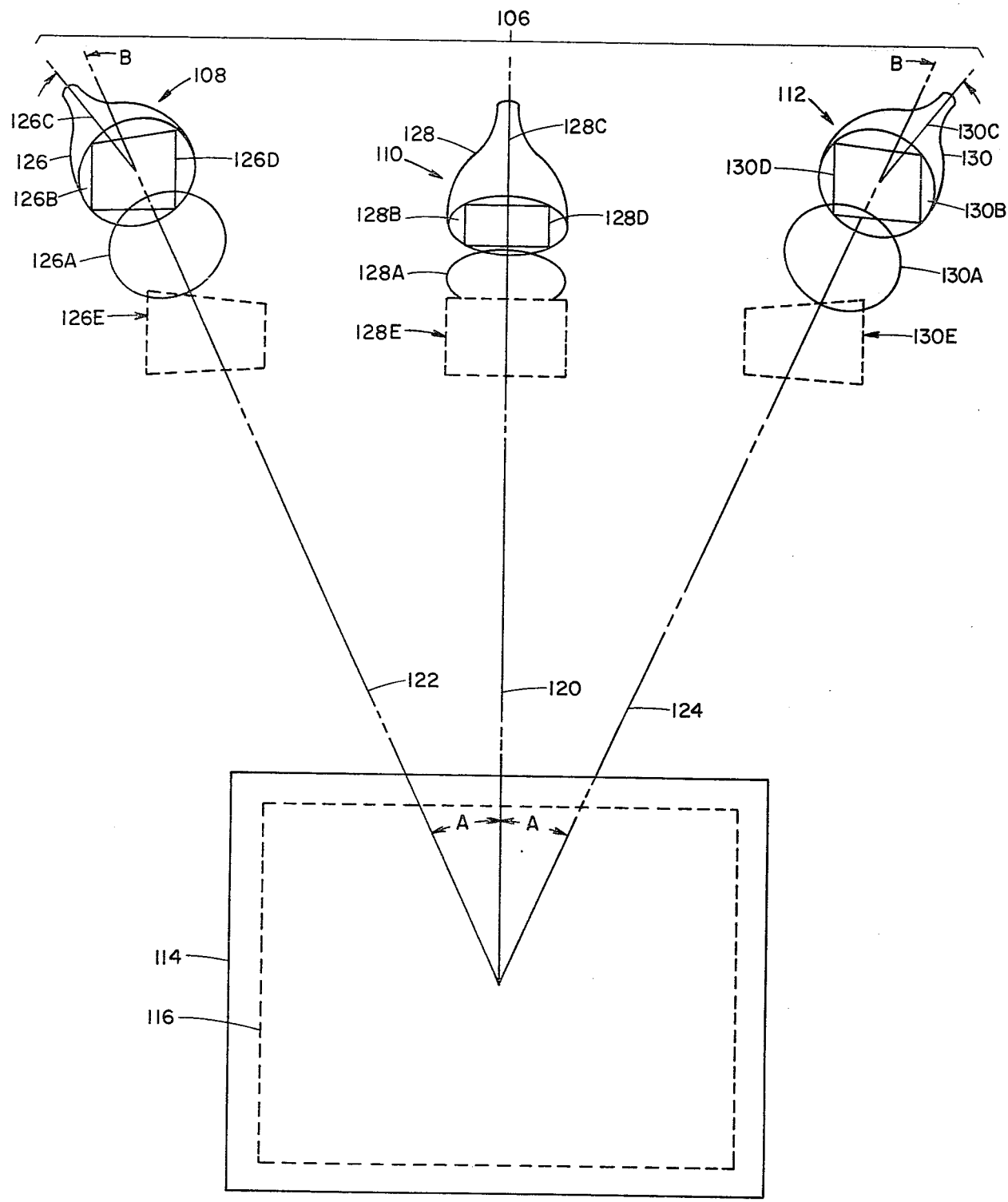
FIG. 7 is a simplified view in perspective of a projection television system having three light projection means according to the invention.

A bank of three light projection means according to the invention for use in a projection television system is shown by FIG. 7 (and by FIG. 8, as will be noted). Bank 106 comprises light projection means 108, 110 and 112 for projecting, by way of example, red, green and blue images, respectively, to form a composite color image in space. A projection screen 114 provides for receiving the composite color image 116, the perimeter of which is indicated by the dash lines.

Light projection means 108, 110 and 112 comprise, respectively, cathode ray tube means 126, 128 and 130, and associated lens means 126A, 128A and 130A. Each tube has a cathodoluminescent screen indicated, again respectively, by 126B, 128B and 130B disposed on the inside surface of the face panel thereof. Each light projection means has electron-beam generating means disposed on an associated electron-optical axis 126C, 128C and 130C for forming an electron image on the associated cathodoluminescent screen; the electron images are converted to visible images by the respective cathodoluminescent screens. Lens means 126A, 128A and 130A provide for projecting on projection screen 114 the light images of respective electron-formed visible images to form composite color image 116.

Light projection means 110 is shown as being "on-axis"; that is, its electron optical axis 128C is congruent with its projection optical axis 120. As a result, the electron-formed visible image 128D formed on its screen 128B is rectilinear. Also as a result, the light image 128E that it projects is rectilinear and the light image cast on the screen is rectilinear and in coincidence with the composite color image 116, of which it forms a part.

Light-projection means 108 and 112, however, project a light image inherently having non-linear magnification distortion attributable to their location off the projection screen axis 120. This inherent distortion is compensated for according to the principles of the invention by the electron-optical axes 126C and 130C of the respective cathode ray tube means 126 and 130 each defining a non-zero, acute-angle B with respect to the axes of the associated cathodoluminescent screens 126B and 130B. The value of angles B and the orientation of the electron-optical axes is selected to cause the electron-formed visible images 126D and 130D to have an orientation and non-linear magnification distortion effective to substantially compensate for the off-axis-induced non-linear magnification distortion of the projected light images. The projected light images are indicated as being trapezoidal images 126E and 130E, respectively, as projected by light-projection means 108 and 112. The projected light images 126E and 130E, when cast on projection screen 114 are substantially free of non-linear magnification distortion, and are indicated as being mutually coincident with the rectilinear composite color image 116.

The projection system described can comprise a bank of three light-projection means oriented side-by-side in a horizontal plane. This embodiment of the invention is indicated by the three light-projection means comprising bank 144 of FIG. 8. Alternately, the light projection means could as well comprise a vertical stack, as indicated by the light-projection means of column 150.

FIG. 8 shows an array 140 of three banks 142, 144 and 146 of light projection means according to the principles of the invention for projecting a very bright composite image. (Associated lens means are not shown.) Each bank consists of three light projection means for projecting into coincidence with adjacent light projection means red, green and blue images, respectively. The order of the color images is exemplary only, and not limiting. The column 148 of light projection means may, for example, project red images; center column 150 may project green images, and column 152, blue images, to form the composite color image in space. A spaced-apart projection screen (not shown) receives and displays the composite color image.

Each light projection means in array 140 comprises a cathode ray tube means having a cathodoluminescent screen on the inside surface of the face panel thereof whose axis is substantially parallel with its projection optical axis. Electron-beam generating means are disposed on the cathode ray tube electron-optical axis for forming an electron image on the cathodoluminescent screen which is thereby converted to a visible image. The lens means (not shown) provide for projecting on the projection screen a light image of the electron-formed visible image that is on the cathodoluminescent screen. As described heretofore with regard to other configurations of projection television system according to the invention, the light images of off-axis-located cathode ray tubes inherently have non-linear magnification distortion attributable to the location of the projection means off the projection screen axis. The array projection system according to the invention is characterized by the cathode ray tube electron optical axis of each of the off-axis projection means defining a non-zero, acute angle with respect to the axis of the cathodoluminescent screen. The value of the angle and the orientation of the electron-optical axis is selected to cause the electron-formed visible image to have an orientation and non-linear magnification distortion effective to compensate for the off-axis-induced non-linear magnification distortion of the projected light image.

The electron-formed visible images of the off-axis cathode ray tubes of the nine-tube array shown by FIG. 8 are effective to substantially compensate for the off-axis location of the respective cathode ray tubes. Image A, projected by a center tube, whose projection optical axis is congruent with the screen axis, is shown as being non-distorted, and when projected, will form a rectilinear image on the projection screen. The images B and C of the adjacent off-axis cathode ray tubes are shown as being trapezoidal and keystone-shaped, respectively, but when projected will substantially compensate for the off-axis-induced non-linear magnification distortion of the projected images. Images D of the corner cathode ray tubes, which may be termed "scalene quadrilaterals," similarly compensate for the off-axis location of the associated cathode ray tubes. The result is that the red, green and blue images when projected form a composite color image in space wherein any non-linear magnification distortion due to off-axis location is substantially compensated for. (It must be remembered that the associated lens means reverse the images.)

An array of light-projection means, shown as numbering nine in FIG. 8, may comprise a lesser number according to the invention. For example, the array may comprise two banks, such as banks 142 and 144, or, banks 144 and 146.

FIG. 9 depicts another embodiment of the invention wherein a cathode ray tube 154 comprising a component of a light-projection means for a projection television system has a face panel 156 and associated cathodoluminescent screen disposed on the projection optical axis 160. The projection system is characterized by the electron-beam axis 162 defining a non-zero, acute-angle B with respect to the projection optical axis 160. The value of angle B and the orientation of the electron-beam axis 162 is selected according to the principles of the invention to cause the electron-formed visible image on cathodoluminescent screen 158 to have an orientation and a non-linear magnification distortion effective to substantially compensate for the off-axis-induced non-linear magnification distortion of the projected light image.

Another configuration of a cathode ray tube constructed according to the principles of the invention is shown by FIG. 10, wherein the axis 157 of the electron-beam generating means 159 defines a non-zero, acute-angle B with respect to the projection optical axis 161. The neck 163, which encloses electron-beam generating means 159, is shown as extending at a non-zero, acute-angle from a hemispherical funnel section 165. It should be noted that the angle B depicted is exaggerated for illustrative purposes; the non-zero, acute-angle B in this and all figures is, as a general rule in the range of a nominal 5 to 9 degrees. This range is provided for example only, and is not a limitation.

A method for compensating for the non-linear magnification distortion of the image projected by a light projection means whose projection optical axis is oriented off the projection screen axis comprises the following. A cathode ray tube is provided which includes associated projection lens means; these components comprise the light projection means. The cathode ray tube means has a cathodoluminescent screen on the inside surface of the face panel thereof whose axis is substantially parallel to the projection optical axis. An electron-beam generating means is disposed on an electron-optical axis of the cathode ray tube for forming an electron image on the cathodoluminescent screen which is converted to a visible image by the cathodoluminescent screen. The cathode ray tube electron-optical axis is positioned so as to define a non-zero, acute angle with respect to the axis of the cathodoluminescent screen. A value of the angle and an orientation of the electron-optical axis is selected to cause the electron-formed visible image to have an orientation and non-linear magnification distortion effective to substantially compensate for the off-axis-induced non-linear magnification distortion of the projected light image. Alternately, the method may comprise the positioning of the cathode ray tube electron-optical axis so as to define a non-zero, acute angle with respect to the projection optical axis.

Here follows a description for utilizing the means according to the invention in a projection television system. It is to be recognized that the means described are by way of example only, and that other arrangements and configurations within the spirit and scope of the invention will readily occur to those skilled in the art.

The cathode ray tube means preferably comprise round face panel tubes having a face panel diameter of about 5 inches. The face panels of one or more of the tubes used in a multiple-tube system could as well be rectangular or square, if desired. The monochrome phosphor, whether red, green or blue, deposited on the cathodoluminescent screen that converts the electron image to a visible image, is preferably a high-emission type for optimum image brightness; such phosphors are well known in the present art. The cathode ray tube deflection angle is preferably about 70°, an angle which provides a short-necked tube which permits display cabinet depth reduction in tight packaging concepts.

The electron gun is preferably of the high-performance type, one that will produce a small beam spot with minimum spot blooming at high beam currents to provide good resolution. For maximum brightness, the ultor anode voltage is preferably in the range of 28–30 kilovolts. The standard CRT electron gun configurations—the bipotential, the unipotential, or the extended field lens—all lend themselves readily to application in projection television system.

A salient benefit of the system is that a relatively simple, uniform-field deflection yoke can be used; the yokes can be identical for all cathode ray tubes in the projection system according to the invention. Because there is no need for elaborate electronic circuits to correct for trapezoidal distortion, the secondary high-speed writing yoke normally mounted behind the deflection yoke in certain prior art projection systems is not required.

The lens means, one of which is associated with each cathode ray tube, may comprise for example, and aspheric, three-element lens having coated surfaces, and preferably a five-inch focal length. For maximum brightness of the projected image, the lens should be of the high-speed type of F1.0 or less. The lens is preferably permanently mounted in conjunction with its associated cathode ray tube, so no adjustments will be necessary either in factory or field.

A bank of light-projection systems arranged for side-by-side mounting in a horizontal plane, as depicted by FIG. 7, can be mounted permanently and without the need for adjustment on a rigid metal bed. Once mounted, no mechanical adjustments in azimuth or elevation will be necessary.

It has been observed in connection with FIG. 7 that the electron-optical axis 128C of light projection means 110 is congruent with its projection optical axis 120. The light projection means 108 and 112 adjacent to light projection means 110, however, lie off-axis; that is, their projection optical axes 122 and 124 lie at non-zero acute-angles A with respect to the projection screen axis 120, as indicated. The electron-optical axes of each off-axes projection means 108 and 112 define, according to the invention, a non-zero, acute-angle B with respect to the screen axes 120, accordingly to one embodiment of the invention.

The non-zero, acute-angle A may be, for example, seven degrees. The non-zero, acute-angle B may also be seven degrees, and as a general rule, angles A and B may be considered to be equal. The value of angle B and the orientation of the electron-optical axes is selected and is effective to provide an electron-formed visible image configured and oriented to substantially compensate for the aforedescribed off-axis induced trapezoidal distortion. The angle values cited, both of which are described for exemplary purposes as being about seven degrees, are in no way limiting but are cited as a preferred embodiment. Angles in the range of five to nine degrees, or greater or lesser, could as well be utilized, with the selection of the particular angle made on the basis of the requirements of a particular projection system. Factors in the determination of the proper angles include the location of the off-axis tube, focal length of the lens, the magnification of the lens, the size of the projection screen, and the distance between the light projection means and the projection screen, and the distance the off-axis tubes are from the screen axis.

The projection screen of the preferred embodiment is 50 inches in diagonal measure, and the aspect ratio is 3:4, in consonance with the standard television picture format. The distance from the electron image on the cathodoluminescent screen of the cathode ray tube is typically 58.3 inches. The screen may be either a rear projection type or a front projection type. Gain is normally built into the screen to provide added brightness; the gain factor may be as great as 10.

The optical path of the projection system may be "folded"; that is, mirrors may be used between the light projection means and the projection screen so that the projection system can be embodied in a relatively small cabinet. Adjustments in the location of the image on the projection screen can be accomplished by tilting of one or more of the mirrors by simple mechanical means known in the art.

Adjustments for static and dynamic convergence of the discrete monochrome images that make up a composite color image, as well as other adjustments such as horizontal sweep and purity, can be accomplished with standard television receiver circuits in present use.

Figure 11:
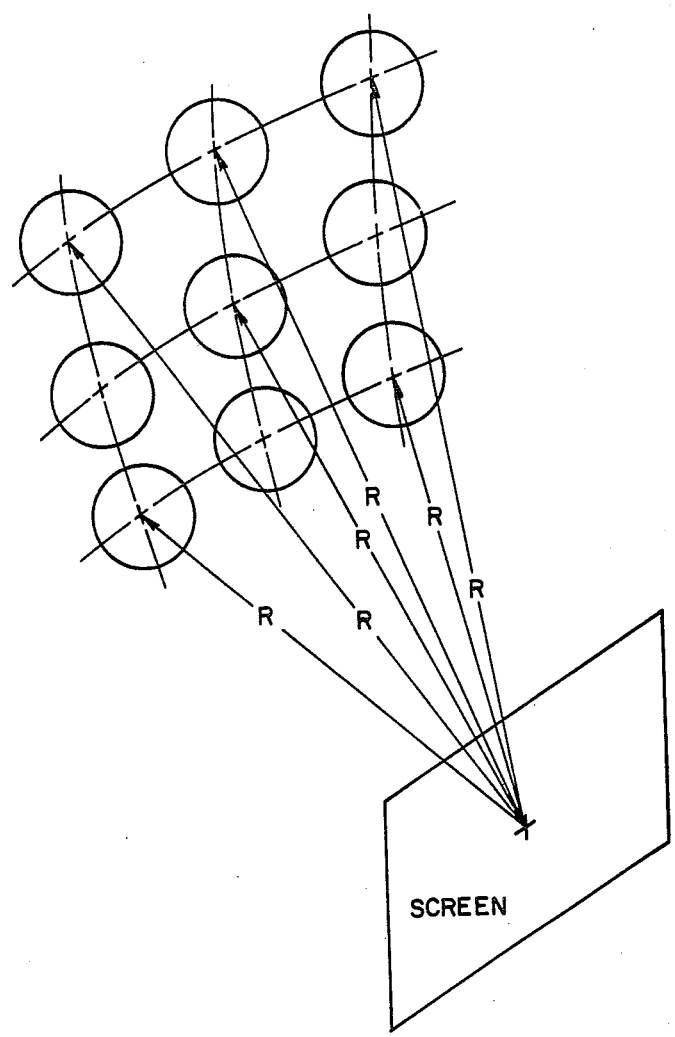
FIGS. 11 and 12 indicate diagramatically the relative positions and orientations of an array of light-projection components according to the invention.
Figure 12:
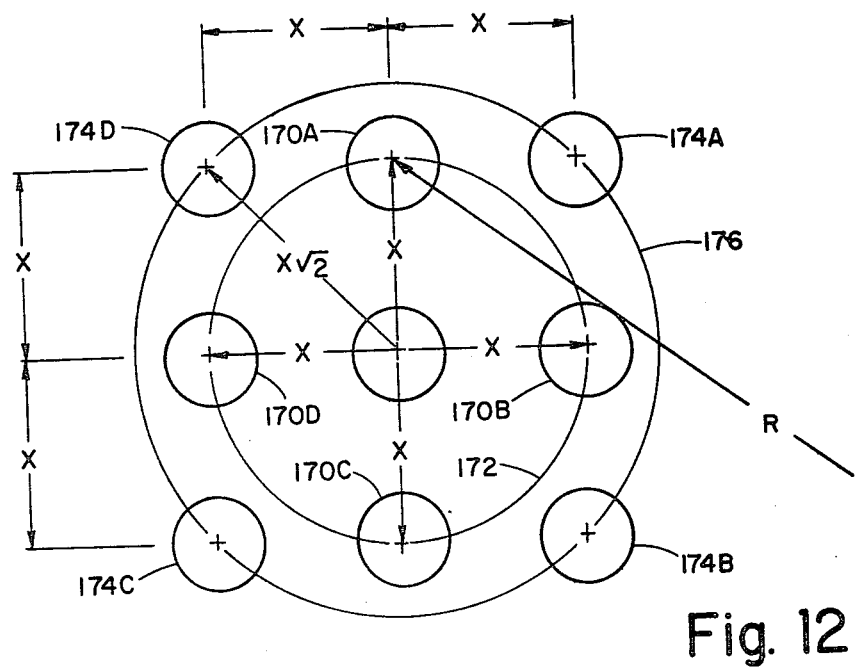

As indicated by FIG. 11, the face panels of all cathode ray tubes of an array (whatever the number in the array, whether three, four, six or nine, e.g.) are positioned with respect to the screen on a spherical surface with a radius R; that is, the center of each face panel is perpendicular to a sphere radius R extended from the center of the projection screen. The spatial relationship of the face panels of an array of nine cathode ray tubes is shown by FIG. 12. If a sphere radius R is drawn through the centers of the face panels 170A, 170B, 170C and 170D on a radius x from the center point of the array, a right circular cone is generated whose base is indicated by 172, and whose apex is the center of the projection screen. Face panels 170A–D are off the projection optical axis by the same angular magnitude. This is the aforedescribed non-zero, acute-angle A. The face panels 174A, 174B, 174C and 174D, however, are on a radius $x\sqrt{2}$ with respect to the center of the array, and the non-zero, acute-angle formed with respect to these near-or on-diagonal tubes is a complex angle having both horizontal and vertical components relative to the axis of the cathodoluminescent screen. The base of the right circular cone on which face panels 174A–D depend is indicated by reference number 176.

Figures 13A, 13B:
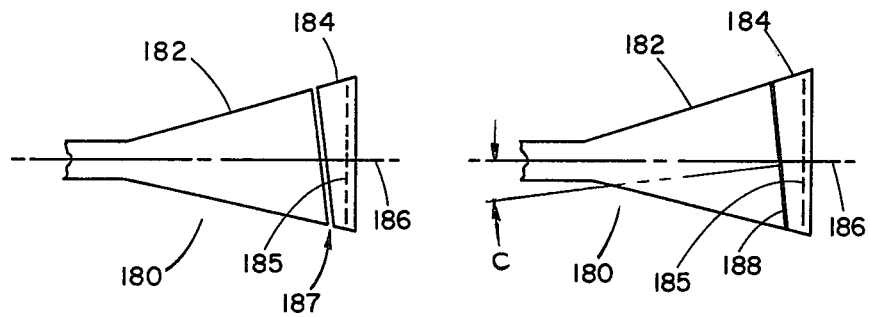
FIGS. 13A-C are views in elevation of a cathode ray tube showing steps in the process of forming the cathode ray tube according to the invention disclosed in referent copending application Ser. No. (D4097).

It will be observed that, in the embodiments of the cathode ray tubes configured according to the principles of the invention, the respective face panels lie at an angle with respect to the associated electron-optical axis. It will also be observed that several different face panel-funnel configurations may be required, especially in multiple-cathode ray tube arrays such as depicted in FIG. 8. While each configuration could be cast in its own separate, distinct glass mold, the cost would be prohibitive. It is more expedient and far less costly to use the means described and fully claimed in the referent copending application Ser. No. (D4097). This preferred means is illustrated schematically in FIGS. 13A–C wherein is depicted a cathode ray tube 180 having a funnel 182 and a face panel 184, with a cathodoluminescent screen 185 disposed on the inside surface of face panel 184. The axis of the face panel 184 is indicated as being parallel with the projection optical axis 186. Funnel 182 and face panel 184 are shown in FIG. 13A as being separated at parting line 187, which lies in a plane having a normal parting angle with respect to projection optical axis 186. The parting can be accomplished, for example (figuratively) by sawing, or more practically, by forming the respective parts by molding. If the angle B described heretofore is, by way of example, 7 degrees, the parting angle C is preferably 3½ degrees.

Figure 13C:
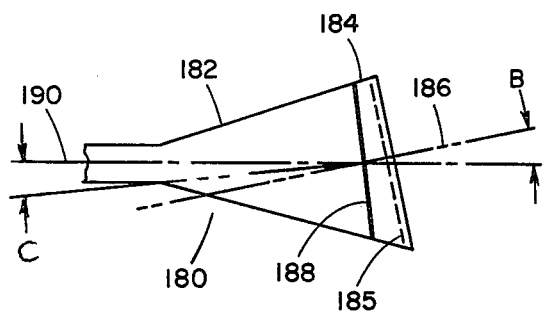

FIG. 13B shows for exemplary purposes the funnel 182 and face panel 184 of FIG. 13A rejoined at seal land 188. Face panel 184 is indicated as being unrotated with respect to funnel 82, so the axis of face panel 184 and the associated cathodoluminescent screen 185 remains parallel with the projection optical axis 186. In FIG. 13C, however, face panel 184 is indicated as being rotated in relation to funnel 182. As a result of the rotation, the electron-optical axis 190, hitherto congruent with projection optical axis 186, now defines a non-zero, acute-angle B with respect to the axis of cathodoluminescent screen 185 and the projection optical axis 186, in accord with the present invention. Assuming a parting angle C of 3.5°, a rotation of face panel 184 by 180 degrees with respect to funnel 182 provides a cathode ray tube wherein the "cant angle" of the screen relative to the electron-optical axis is a desired 7 degrees. A tube having this characteristic could be used, for example, in the off-axis locations of bank 144 and row 150 of the array according to the present invention shown by FIG. 8. Selecting the proper value of the angle B and the orientation of the electron-optical axis 190 causes the electron-formed visible images (images B, C and D of FIG. 8, for example) to have an orientation and non-linear magnification distortion effective to substantially compensate for the off-axis-induced, non-linear magnification distortion of the projected light image, all in accord with the present invention.

Other changes may be made in the above-described apparatus without departing from the true spirit and scope of the invention herein involved and it is intended that the subject matter in the above depiction shall be interpreted as illustrative and not in a limiting sense.

I claim:

1. For use in a projection television system having a projection screen for displaying a light image cast thereon, said screen being spaced apart from at least one light projection means whose projection optical axis lies at a non-zero, acute-angle A with respect to the screen axis, said light projection means comprising:

cathode ray tube means having a cathodoluminescent screen on the inside surface of a face panel thereof whose axis is substantially parallel to said projection optical axis, and electron-beam generating means disposed on the cathode ray tube electron-optical axis for forming an electron image on said cathodoluminescent screen which is converted to a visible image by said screen;

lens means on said projection optical axis for projecting on said projection screen the light image of the electron-formed visible image on said cathodoluminescent screen, said light image inherently having non-linear magnification distortion attributable to the location of said projection means off said projection screen axis;

said system being characterized by the cathode ray tube electron-optical axis defining a non-zero, acute-angle B with respect to the axis of said cathodoluminescent screen, the value of said angle B and the orientation of said electron-optical axis being selected to cause said electron-formed visible image to have an orientation and non-linear magnification distortion effective to substantially compensate for said off-axis-induced non-linear magnification distortion of said projected light image.

2. For use in a projection television system having a projection screen for displaying a light image cast thereon, said screen being spaced apart from at least one light projection means whose projection optical axis lies at a non-zero, acute-angle A with respect to the screen axis, said light projection means comprising:

cathode ray tube means having a cathodoluminescent screen on the inside surface of a face panel thereof whose axis is parallel to said projection optical axis, and electron-beam generating means disposed on the cathode ray tube electron-optical axis for forming an electron image on said cathodoluminescent screen which is converted to a visible image by said screen;

lens means on said projection optical axis for projecting on said projection screen the light image of the electron-formed visible image on said cathodoluminescent screen, said light image inherently having non-linear magnification distortion attributable to the location of said projection means off said projection screen axis;

said system being characterized by the cathode ray tube electron-optical axis defining a non-zero, acute-angle B with respect to the axis of said cathodoluminescent screen, the value of said angle B and the orientation of said electron-optical axis being selected to cause said electron-formed visible image to have an orientation and non-linear magnification distortion effective to substantially compensate for said off-axis-induced non-linear magnification distortion of said projected light image.

3. For use in a projection television system having a bank of three light projection means for projecting into coincidence red, green and blue images, respectively, to form a composite color image in space, and having a spaced-apart projection screen for receiving and displaying said composite color image, the central projection means having its projection optical axis congruent with the projection screen axis, with the adjacent ones of said projection means lying off-axis, that is, each having a projection optical axis lying at a non-zero, acute-angle A with respect to said projection screen axis, each off-axis light projection means comprising:

cathode ray tube means having a cathodoluminescent screen on the inside surface of the face panel thereof whose axis is substantially parallel to said projection optical axis, and electron-beam generating means disposed on the cathode ray tube electron-optical axis for forming an electron image on said cathodoluminescent screen which is converted to a visible image by said cathodoluminescent screen;

lens means on said projection optical axis for projecting on said projection screen the light image of the electron-formed visible image on said cathodoluminescent screen, said light image inherently having non-linear magnification distortion attributable to the location of said projection means off said projection screen axis;

said system being characterized by the cathode ray tube electron-optical axis of each off-axis projection means defining a non-zero, acute-angle B with respect to the axis of said cathodoluminescent screen, the value of said angle B and the orientation of said electron-optical axis being selected to cause said electron-formed visible image to have an orientation and non-linear magnification distortion effective to substantially compensate for said off-axis-induced non-linear magnification distortion of said projected light image.

4. The projection system defined by claim 3 wherein said bank of three light-projection means are oriented side-by-side in a horizontal plane.

5. The projection system defined by claim 3 wherein said light projection means are vertically stacked.

6. For use in a projection television system having a projection screen for displaying a light image cast thereon, said screen being spaced apart from at least one light projection means whose projection optical axis lies at a non-zero, acute angle A with respect to the screen axis, said light projection means comprising:

cathode ray tube means having a face panel, a neck and a funnel, the axis of said face panel disposed on said projection optical axis, said face panel having a cathodoluminescent screen on the inside surface thereof, and electron-beam generating means disposed within said neck on an electron-beam axis for forming an electron image on said cathodoluminescent screen which is converted to a visible image by said cathodoluminescent screen;

lens means on said projection optical axis for projecting on said projection screen the light image of the electron-formed visible image, said light image inherently having non-linear magnification distortion caused by variable magnification effects attributable to the location of said projection means off said projection screen axis;

said system being characterized by said electron-beam axis defining a non-zero, acute-angle B with respect to said projection optical axis, the value of said angle B at the orientation of said electron-beam axis being selected to cause said electron-formed visible image to have an orientation and non-linear magnification distortion effective to substantially compensate for the off-axis-induced non-linear magnification distortion of said projected light image.

7. For use in a projection television system having an array of at least two banks of light projection means, each bank consisting of three of said light projection means for projecting in coincidence with the light projection means of others of said banks red, green and blue images, respectively, to form a composite color image in space, said system having a spaced-apart projection screen for receiving and displaying said composite color image, said system having a plurality of light projection means whose projection optical axes lie off axis, that is, lie at a non-zero, acute angle with respect to the projection screen axis, each off-axis light projection means comprising:

cathode ray tube means having a cathodoluminescent screen on the inside surface of the face panel thereof whose axis is substantially parallel to said projection optical axis, and electron-beam generating means disposed on the cathode ray tube electron-optical axis for forming an electron image on said cathodoluminescent screen which is converted to a visible image by said cathodoluminescent screen;

lens means on said projection optical axis for projecting on said projection screen the light image of the electron-formed visible image on said cathodoluminescent screen, said light image inherently having non-linear magnification distortion attributable to the location of said projection means off said projection screen axis;

said system being characterized by the cathode ray tube electron-optical axis of each off-axis projection means defining a non-zero, acute-angle with respect to the axis of said cathodoluminescent screen, the value of said angle and the orientation of said electron-optical axis being selected to cause said electron-formed visible image to have an orientation and non-linear magnification distortion effective to substantially compensate for said off-axis-induced non-linear magnification distortion of said projected light image.

8. A method for compensating for the non-linear magnification distortion of the image projected by a light projection means on the spaced-apart projection screen of a projection television system, said distortion resulting from the orientation of the projection optical axis of said light projection means being off the axis of said projection screen, the method comprising:

providing a cathode ray tube including associated projection lens means comprising said light projection means, said cathode ray tube means having a cathodoluminescent screen on the inside surface of the face panel thereof whose axis is substantially parallel to said projection optical axis;

disposing electron-beam generating means on an electron-optical axis of said cathode ray tube for forming an electron image on said cathodoluminescent screen which is converted to a visible image by said screen;

positioning said cathode ray tube electron-optical axis so as to define a non-zero, acute angle with respect to the axis of said cathodoluminescent screen;

selecting a value of said angle and an orientation of said electron-optical axis to cause said electron-formed visible image to have an orientation and non-linear magnification distortion effective to substantially compensate for the off-axis-induced non-linear magnification distortion of said projected light image.

9. A method for compensating for the non-linear magnification distortion of the image projected by a light projection means on the spaced-apart projection screen of a projection television system, said distortion resulting from the orientation of the projection optical axis of said light projection means being off the axis of said projection screen, the method comprising:

providing a cathode ray tube including associated projection lens means comprising said light projection means, said cathode ray tube means having a cathodoluminescent screen on the inside surface of the face panel thereof whose axis is substantially parallel to said projection optical axis;

disposing electron-beam generating means on an electron-optical axis of said cathode ray tube for forming an electron image on said cathodoluminescent screen which is converted to a visible image by said screen;

positioning said cathode ray tube electron-optical axis so as to define a non-zero, acute-angle with respect to said projection optical axis;

selecting a value of said angle and an orientation of said electron-optical axis to cause said electron-formed visible image to have an orientation and non-linear magnification distortion effective to substantially compensate for the off-axis-induced non-linear magnification distortion of said projected light image.

10. For use in a projection television system having a bank of three light projection means for projecting red, green and blue images, respectively, to form a composite color image in space, said system having a spaced-apart projection screen for receiving and displaying said composite color image, said light projection means having projection optical axes which lie off axis, that is, lie at a non-zero, acute angle with respect to the projection screen axis, each light projection means comprising:

cathode ray tube means having a cathodoluminescent screen on the inside surface of the face panel thereof whose axis is substantially parallel to said projection optical axis, and electron-beam generating means disposed on the cathode ray tube electron-optical axis for forming an electron image on said cathodoluminescent screen which is converted to a visible image by said cathodoluminescent screen;

lens means on said projection optical axis for projecting on said projection screen the light image of the electron-formed visible image on said cathodoluminescent screen, said light image inherently having non-linear magnification distortion attributable to the location of said projection means off said projection screen axis;

said system being characterized by the cathode ray tube electron-optical axis of each projection means defining a non-zero, acute-angle with respect to the axis of said cathodoluminescent screen, the value of said angle and the orientation of said electron-optical axis being selected to cause said electron-formed visible image to have an orientation and non-linear magnification distortion effective to substantially compensate for said off-axis-induced non-linear magnification distortion of said projected light image.

11. For use in a projection television system having a bank of three light projection means for projecting red, green and blue images, respectively, to form a composite color image in space, said system having a substantially rectangular front projection screen for receiving and displaying said composite color image, with the major axis of said screen being horizontally oriented, said light projection means having projection optical axes which lie off axis, that is, lie at a non-zero, acute angle with respect to the projection screen axis, each off-axis light projection means comprising:

cathode ray tube means having a cathodoluminescent screen on the inside surface of the face panel thereof whose axis is substantially parallel to said projection optical axis, and electron-beam generating means disposed on the cathode ray tube electron-optical axis for forming an electron image on said cathodoluminescent screen which is converted to a visible image by said cathodoluminescent screen;

lens means on said projection optical axis for projecting on said projection screen the light image of the electron-formed visible image on said cathodoluminescent screen, said light image inherently having non-linear magnification distortion attributable to the location of said projection means off said projection screen axis;

said system being characterized by the cathode ray tube electron-optical axis of each projection means defining a non-zero, acute-angle with respect to the axis of said cathodoluminescent screen, the value of said angle and the orientation of said electron-optical axis being selected to cause said electron-formed visible image to have an orientation and non-linear magnification distortion effective to substantially compensate for said off-axis-induced non-linear magnification distortion of said projected light image.

12. The projection television system defined by claim 11 wherein said bank of light projection means is a side-by-side horizontal array which lies beneath the plane of the major axis of said viewing screen for projection upwards towards said screen.

13. The projection television system defined by claim 11 wherein said bank of light projection means is a side-by-side horizontal array which lies above the plane defined by the major axis of said viewing screen for projection downwards toward said screen.

14. The projection television system defined by claim 11 wherein said bank of light projection means is a vertically stacked array positioned to the right of the plane of the mirror axis of said screen for projection towards said screen from its right side.

15. The projection system defined by claim 11 wherein said bank of light projection means is a vertically stacked array positioned to the left of the minor axis of said screen for projection towards said screen from its left side.

16. For use in a projection television system having a bank of three light projection means for projecting red, green and blue images, respectively, to form a composite color image in space, said system having a substantially rectangular front projection screen for receiving and displaying said composite color image, with the major axis of said screen being horizontally oriented, said bank of light projection means being a side-by-side horizontal array which lies beneath the plane of said major axis for projection upwards towards said screen, said light projection means having projection optical axes which lie off axis, that is, lie at a non-zero, acute angle with respect to the projection screen axis, each off-axis light projection means comprising:

cathode ray tube means having a cathodoluminescent screen on the inside surface of the face panel thereof whose axis is substantially parallel to said projection optical axis, and electron-beam generating means disposed on the cathode ray tube electron-optical axis for forming an electron image on said cathodoluminescent screen which is converted to a visible image by said cathodoluminescent screen;

lens means on said projection optical axis for projecting on said projection screen the light image of the electron-formed visible image on said cathodoluminescent screen, said light image inherently having non-linear magnification, distortion attributable to the location of said projection means off said projection screen axis;

said system being characterized by the cathode ray tube electron-optical axis of each projection means defining a non-zero, acute-angle with respect to the axis of said cathodoluminescent screen, the value of said angle and the orientation of said electron-optical axis being selected to cause said electron-formed visible image to have an orientation and non-linear magnification distortion effective to substantially compensate for said off-axis-induced non-linear magnification distortion of said projected light image.

17. For use in a projection television system having a bank of three light projection means for projecting red, green and blue images, respectively, to form a composite color image in space, said system having a substantially rectangular front projection screen for receiving and displaying said composite color image, with the major axis of said screen being horizontally oriented, said bank of light projection means being a side-by-side horizontal array which lies above the plane defined by said major axis for projection downwards toward said screen, said light projection means having projection optical axes which lie off axis, that is, lie at a non-zero, acute angle with respect to the projection screen axis, each off-axis light projection means comprising:

cathode ray tube means having a cathodoluminescent screen on the inside surface of the face panel thereof whose axis is substantially parallel to said projection optical axis, and electron-beam generating means disposed on the cathode ray tube electron-optical axis for forming an electron image on said cathodoluminescent screen which is converted to a visible image by said cathodoluminescent screen;

lens means on said projection optical axis for projecting on said projection screen the light image of the electron-formed visible image on said cathodoluminescent screen, said light image inherently having non-linear magnification distortion attributable to the location of said projection means off said projection screen axis;

said system being characterized by the cathode ray tube electron-optical axis of each projection means defining a non-zero, acute-angle with respect to the axis of said cathodoluminescent screen, the value of said angle and the orientation of said electron-optical axis being selected to cause said electron-formed visible image to have an orientation and non-linear magnification distortion effective to substantially compensate for said off-axis-induced non-linear magnification distortion of said projected light image.

* * * * *